(12) United States Patent
Fronczak

(10) Patent No.: US 7,664,247 B1
(45) Date of Patent: Feb. 16, 2010

(54) METHODS AND APPARATUS FOR INTEGRATING AUTOMATIC ROUTE SELECTION WITH AIN SERVICES

(75) Inventor: Lawrence J. Fronczak, Marlton, NJ (US)

(73) Assignee: Verizon Services Corp., Arlington, VA (US)

( * ) Notice: Subject to any disclaimer, the term of this patent is extended or adjusted under 35 U.S.C. 154(b) by 1510 days.

(21) Appl. No.: 10/072,517

(22) Filed: Feb. 6, 2002

(51) Int. Cl.
*H04M 3/42* (2006.01)

(52) U.S. Cl. .............................. 379/207.02; 379/211.02; 379/221.08; 379/221.09; 379/221.14; 379/230

(58) Field of Classification Search ............ 379/207.02, 379/211.02, 221.08, 221.09, 221.14, 230
See application file for complete search history.

(56) References Cited

U.S. PATENT DOCUMENTS

| | | | |
|---|---|---|---|
| 5,787,075 A * | 7/1998 | Uchida | 370/252 |
| 5,805,688 A * | 9/1998 | Gillespie et al. | 379/221.08 |
| 5,905,792 A * | 5/1999 | Miloslavsky | 379/265.11 |
| 6,160,877 A * | 12/2000 | Tatchell et al. | 379/197 |
| 6,442,267 B2 * | 8/2002 | Culli et al. | 379/220.01 |
| 6,522,740 B2 * | 2/2003 | Baldwin | 379/207.02 |
| 6,542,598 B2 * | 4/2003 | Fleischer et al. | 379/211.02 |
| 6,563,917 B2 * | 5/2003 | Sabinson et al. | 379/221.08 |
| 6,721,395 B2 * | 4/2004 | Martinez | 379/45 |
| 6,823,058 B1 * | 11/2004 | Schwend et al. | 379/213.01 |
| 6,850,600 B1 * | 2/2005 | Boeckman et al. | 379/45 |

* cited by examiner

*Primary Examiner*—Quynh H Nguyen

(57) ABSTRACT

Methods and apparatus for providing automatic route selection (ARS) services through the use of advanced intelligent network (AIN) functionality are described. AIN based ARS services are provided through the use of a route selection table implemented outside a switch, e.g., at the service control point (SCP). Alternatively, ARS functionality is provided using conditional logic at the SCP or a combination of conditional logic and an ARS table. The AIN based ARS service can be provided in addition to switch based ARS services. Methods for selecting the ARS method to be used based on switch type and/or the complexity of the ARS service to be provided are also described. The ARS functionality identifies the route, e.g., physical trunk or other line, over which a call is to be routed. The selection may be between trunks corresponding to different telecommunications carriers, services or privately owned lines.

6 Claims, 5 Drawing Sheets

METHODS AND APPARATUS FOR INTEGRATING AUTOMATIC ROUTE SELECTION WITH AIN SERVICES

FIELD OF THE INVENTION

The present invention is directed to a communication systems, and more particularly, to methods and apparatus for integrating automatic route selection (ARS) with advanced intelligent networks (AIN) services.

BACKGROUND OF THE INVENTION

Telephones are used by many people around the world to communicate with each other. In order to satisfy customer needs and to provide additional sources of income, telephone companies often provide additional telephone services, e.g., call screening, call forwarding, voice dialing, etc., beyond the basic telephone service to which users have grown accustomed.

These additional or enhanced services can be implemented in a Signal Switching Point (SSP), e.g., a telephone switch, and/or through the use of Advanced Intelligent Network (AIN) functionality. Switched based services tend to be more limited than AIN based services since they are limited by the functionality available in the telephone switch. AIN based services tend to be more robust than switched based services since they are implemented using the considerably more advanced control capability of a service control point (SCP). SCPs operate under software control, e.g., at the direction of processing instructions included in a Call Processing Record (CPR) associated with an individual service subscriber.

Telephone switches normally include an Automatic Route Selection (ARS) table or tables that are used to determine, for switch based ARS subscribers, which telephone trunk should be used to route a call originating from the subscriber. An ARS table normally includes one or more sets of numbers corresponding to the initial digits of a telephone number, e.g., directory number (DN), and a route index for each set of numbers. The route index identifies the trunk over which calls matching the corresponding set of numbers, should be routed for the customer to whom the particular ARS table corresponds. Different trunks used to connect SSPs often correspond to different carriers. Thus, ARS allows a customer to automatically route calls over preferred, e.g., least cost, carriers.

In switch based ARS, when the ARS customer makes a call, the SSP normally accesses the ARS table corresponding to the customer placing the call and determines which route index should be used for call routing to the particular called party directory number (DN) to which the call is directed. The SSP then attempts to route the call via the trunk specified by the route index obtained from the customer's switch based ARS table.

In an AIN system, triggers are set at signal switching points (SSPs), e.g., telephone switches, to detect one of a number of call processing events. In response to the activation of an AIN trigger, an SSP suspends processing of the call that activated the trigger, compiles a message and forwards that message via a common channel interoffice signaling (CCIS) link to a Service Control Point (SCP). Some SCPs are implemented as integrated service control points (ISCP) which include functionality for provisioning AIN services for customers. AIN triggers can occur at any one of several points during the processing of a call.

Once sufficient information about the call has reached the SCP, e.g., via the message from the SSP, the SCP accesses stored call processing information, e.g., a call processing record (CPRs) and generates a message which is returned to the SSP where the trigger was activated. The SSP then resumes call processing following any instructions received from the SCP.

Unfortunately, most telephone switches resume call processing following an AIN trigger at a point which results in the switch's ARS table functionality being bypassed. This can have the unfortunate effect of causing a call which is subjected to AIN processing to be routed by a carrier other than the lowest cost service provider.

An ever increasing number of new telephone services are being implemented as AIN based services rather than switch based services. This is due, in part, to the greater control/processing that the SCP can provide as compared to individual switches. If AIN services are to gain widespread acceptance and use by ARS services subscribers, there needs to be a way to provide ARS functionality in conjunction with AIN services. Absent the ability to provide ARS service in conjunction with AIN services, the potential additional cost associated with failing to use a customer's least cost routing service provider will discourage the use of AIN services.

One telephone switch vendor, Nortel Networks, has added to its telephone switches, e.g., DMS-100 switches, a capability where, in response to receiving a route index having a specific value from an SCP, telephone switch will process the call using the switch's ARS table. In this manner AIN service subscriber's who are serviced by the DMS-100 switch, in some cases, can receive the benefit of a switch based ARS service when an AIN based service is provided.

FIG. 1 illustrates the known technique 1 of providing switch based ARS functionality using a DMS-100 switch when an AIN service is provided. As illustrated the method begins in step 3, e.g., with the start of a call being processed by an SSP which is a DMS-100. In step 5, the call activates an AIN trigger at the DMS-100. Then, in step 7, the DMS-100 halts processing of the call and then, in step 9, transmits a call processing message to an SCP. In step 11, the SCP accesses a CPR based on information received in the call processing message received from the DMS-100 and determines how the call should be processed, e.g., in accordance with an AIN service being provided. After determining how the call should be processed, the SCP, in step 13, generates a response message which includes a route index corresponding to the DMS-100's ARS table. Then, in step 15, the SCP transmits the generated message including the route index corresponding to the DMS-100's ARS table to the DMS-100 SSP. In response to the message and the route index included therein which corresponds to the switch's ARS table, in step 17, the DMS-100 accesses its switch based ARS table and uses it to determine the actual route index to be used to route the call. Then, in step 19 the DMS-100 routes the call using the route index obtained from its ARS table. With the call routed, processing of the call stops in step 21. Where a route index corresponding to an actual trunk is received by the DMS-100 in a message from the SCP, the DMS-100 routes the call using the indicated trunk as opposed to determining the trunk to be used from its ARS table.

The known technique illustrated in FIG. 1 relies on the SCP returning to a DMS-100 switch a route index which corresponds to the switch's ARS table as opposed to an actual trunk coupled to the DMS-100. Since the returned route index is a number corresponding to the DMS-100 ARS table there is no need to maintain an ARS table outside the switch, i.e., route indexes corresponding to actual trunk lines coupled to the switch need not, and are not, stored in the SCP as part of the known DMS-100 method of providing ARS in conjunction with AIN services. Unfortunately, telephone switches from other equipment providers do not include the ability to process a route index corresponding to an ARS table in the manner that the DMS-100 does. Accordingly, while this DMS-100 feature can be used to provide switch based ARS functionality to AIN service subscribers, telephone service customers who are serviced by switches from other manufactures can not take advantage of this functionality.

In order to avoid becoming overly dependent on a single equipment provider, most telephone companies purchase telephone switches from multiple vendors. As a result, a switch based feature available from a single vendor is generally not available to all customers of a telephone service provider since some customers will normally be serviced by a switch from a different vendor. From an implementation and customer satisfaction standpoint it is often desirable to deploy services in a manner that allows the services to be provided to customers regardless of which of the service provider's switches is used to service a customer. In some cases however, because of cost or other advantages, service providers are willing to allow different services to be offered to different customers.

In view of the above discussion, it becomes apparent that there is a need for new and improved methods of providing ARS services in conjunction with AIN services. Given that telephone service subscribers may be serviced by different telephone switches, e.g., some of which do not include the ARS functionality of the DMS-100 switch, it is desirable that at least some methods of providing ARS service be independent of the above discussed DMS-100 functionality. From an implementation standpoint, it is desirable that at least some new methods of providing ARS in conjunction with AIN service be capable of being implemented without requiring the deployment of new telephone switch hardware.

While table based ARS switch functionality has proved beneficial to a wide range of users, as the complexity of telephone systems and service provider relationships increases, it would be nice if ARS service could be enhanced to include conditional logic as part of the route selection process as an alternative to, or in addition to, the current route index look-up capability made possible by existing switch based routing tables.

SUMMARY OF THE INVENTION

The present invention is directed to methods and apparatus for providing automatic route selection (ARS) services through the use of advanced intelligent network (AIN) functionality. AIN based ARS services are provided through the use of a route selection table implemented outside a switch, e.g., at a service control point (SCP) or at another non-switch based location accessible from a service control point.

Alternatively, ARS functionality is provided using conditional logic at the SCP or a combination of conditional logic and an ARS table. The AIN based ARS method of the present invention can be provided in addition to switch based ARS services. Thus, in accordance with the invention, an ARS table may be present in a switch and used for providing an ARS service subscriber ARS service in a conventional manner in conjunction with purely switch based services, while another ARS table is maintained in at the SCP in accordance with the present invention and used for providing ARS services in conjunction with AIN based services, e.g., call forwarding and/or call screening.

As part of the AIN based ARS services of the present invention, the SCP returns a message to the telephone switch where call processing has been paused as a result of the activation of an AIN trigger. The message sent to the telephone switch includes a route index corresponding to a trunk or carrier over which the telephone call is to be routed. The message sent by the SCP to the SSP may be, e.g., a Forward_Call message or an AIN Analyze_Route message.

In various AIN based ARS services of the invention, ARS functionality is implemented in an SCP where conditional logic, not available in switch based ARS implementations, can be used instead of, or in addition to, an ARS table. In some embodiments, custom ARS implementations are provided using SCP based conditional logic to determine the route selection information, e.g., trunk identifier, to be returned to the SSP for use in call routing.

In addition to the various AIN based methods for providing ARS service, the present invention is directed to a method of selecting the ARS implementation technique to be used to provide a subscriber with ARS service. In accordance with the present invention, the particular ARS implementation technique to be used for an individual subscriber is determined as a function of the complexity of the ARS service to be provided and/or the type of telephone switch which is used to provided the subscriber with telephone service.

In cases where the desired ARS service is of a level of complexity such that it can not be implemented using an ordinary ARS routing table, the technique of the present invention which utilizes conditional logic which can be implemented in an SCP is employed to provide ARS service.

The methods and apparatus of the present invention can be used to provide ARS service subscribers ARS service in conjunction with AIN services. Furthermore, the ARS process may be of a level of complexity which can not be implemented using the comparatively limited capabilities of a conventional telephone switch with an ARS table included therein.

Numerous additional features, benefits and details of the methods and apparatus of the present invention are described in the detailed description which follows.

DETAILED DESCRIPTION

As discussed above, the present invention is directed to methods and apparatus for integrating Automatic Routing Selection (ARS) functionality with AIN based services. Various methods of the present invention allow telephone service customers to receive ARS service in conjunction with one or more AIN services, regardless of the type of telephone switch used to connect the service subscriber's line to the PSTN. Thus, the methods and apparatus of the present invention allow customers to use AIN based telephone services, and still use ARS, which allows them to designate a preferred, e.g., least cost, carrier to complete their calls.

Figure 2:
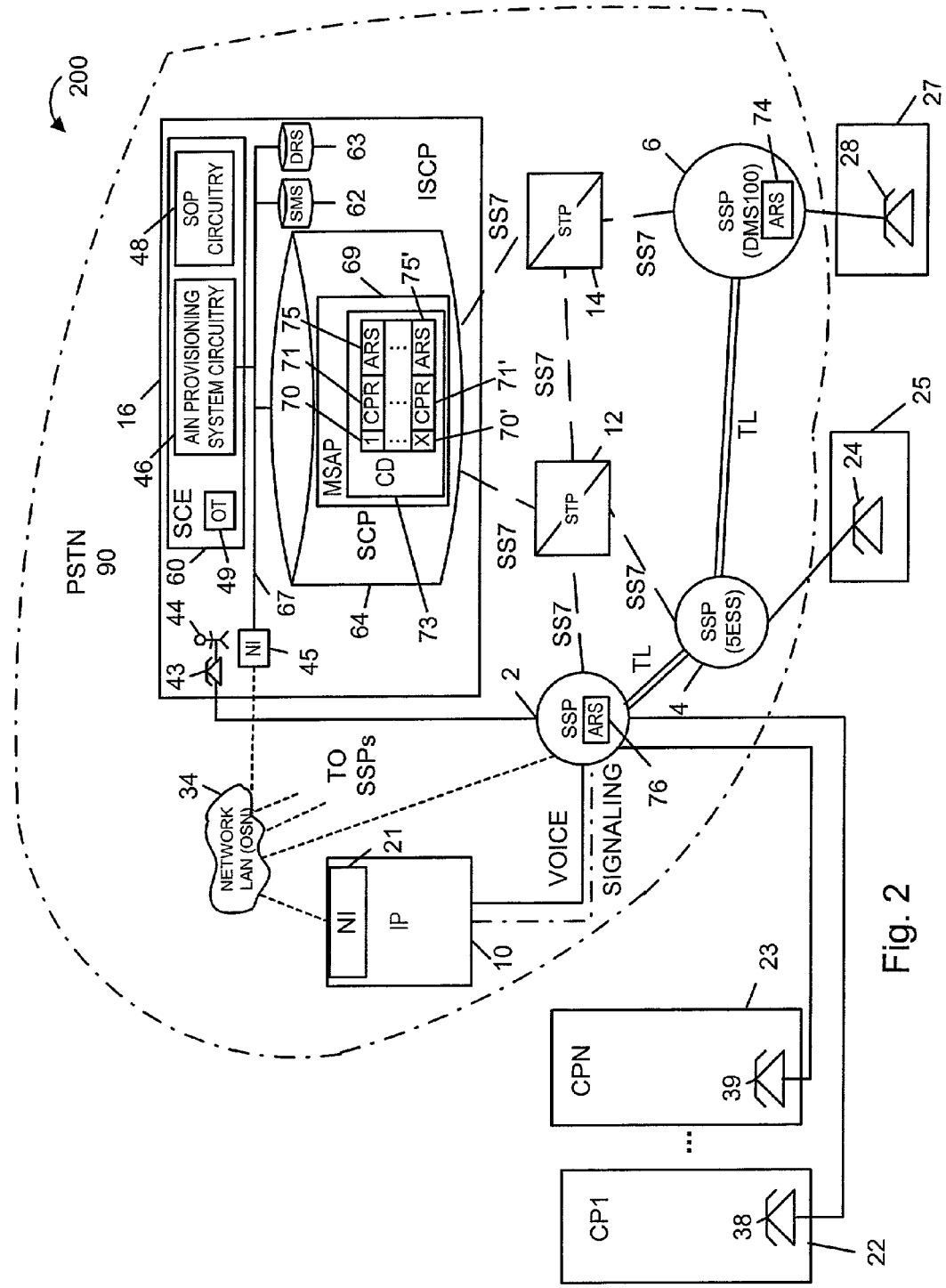
FIG. 2 illustrates a communications system implemented in accordance with the present invention.

FIG. 2 illustrates a communication system 200 implemented in accordance with an exemplary embodiment of the present invention. The system 100 supports communications between a plurality of customer premises 22, 23, 25, 27 via a public switched telephone network (PSTN) 90. The PSTN 90 includes a plurality of Signal Switching Points (SSPs) 2, 4, 6, a plurality of Signal Transfer Points (STPs) 12, 14, an Integrated Service Control Point (ISCP) 16, and an Intelligent Peripheral IP 10. The PSTN 90 also includes a Local Area Network (LAN) 34 which serves as an Operational Services Network (OSN).

Each SSP 2, 4, 6 is implemented using at least one telephone switch. The SSPs 2, 4, 6 may be implemented using known Class V telecommunications switches capable of supporting the Signaling System Seven (SS7) protocol. Examples of telephone switches which may be used to implement an SSP include a DMS-100 switch manufactured by Nortel Networks, a 5ESS switch manufactured by Lucent Technologies, and an ESWD switch also manufactured by Siemens. Frequently, a single telephone company will use switches from multiple vendors to avoid being locked into using a single hardware provider. As a result, SSP 2 may be implemented using, e.g., a DMS-100 switch, SSP 4 may be implemented using a 5ESS switch, while SSP 6 may be implemented using an ESWD switch. Each SSP 2, 4, 6 can correspond to a different telephone central office. Trunk lines (TL), which may be implemented using fiber optic cables, interconnect the various SSPs 2, 4, 6. Trunk lines or groups of trunk lines connected to a switch may be uniquely identified at the switch by the use of route indexes.

Figure 1:
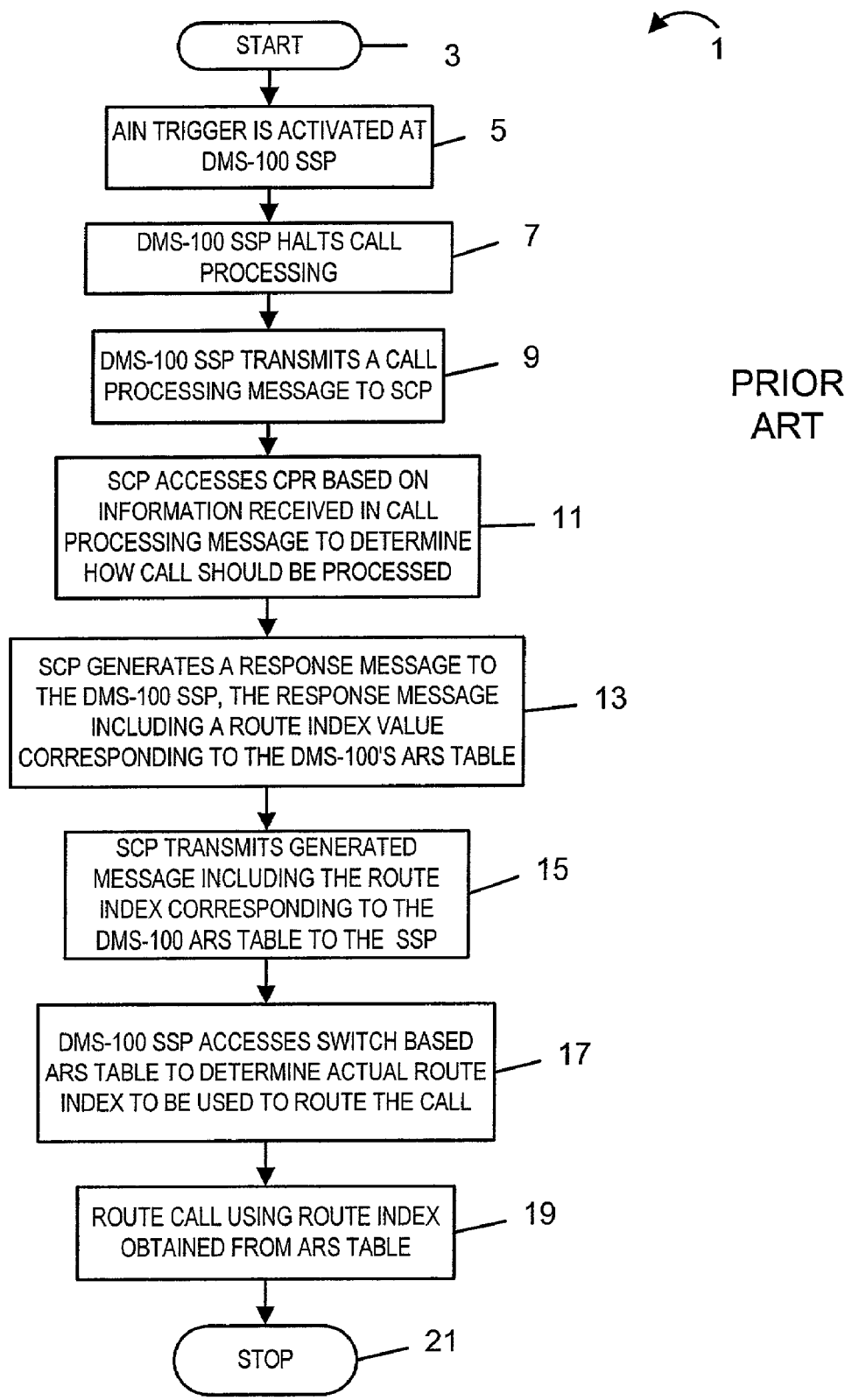
FIG. 1 illustrates a known technique of providing ARS service using a switch based ARS table and a DMS-100 switch.

SSP 2 includes an ARS table 76 for each of the switch based ARS service it serves as an end office switch. Each SSP 2, 4, 6 is normally connected to one or more customer premises (CPs), e.g., telephone service subscriber residences and/or offices, by telephone lines. In the FIG. 1 example, first and second telephony devices 38, 39, located at first and second customer premises 22, 23, are coupled to SSP 2. FIG. 1 also shows additional customer premises 25, 27 that include telephones 24, 28, respectively. Telephone 24 is coupled to SSP 4 while telephone 28 is coupled to SSP 6. Connections between the SSPs and CPs may be by POTS lines, ISDN lines, DSL, or other known communications lines.

The PSTN 90 is implemented as an Advanced Intelligent Network (AIN) and includes an Integrated Service Control Point (ISCP) 16, which is coupled by way of Signal Transfer Points (STPs) 12, 14 to each of the SSPs 2, 4, 6. The STPs 12, 14 serve as Signaling System Seven (SS7) interconnects over which messages, data, and requests for call processing control instructions can be communicated between the SSPs 2, 4, 6, and the ISCP 16. The ISCP 16 can be used to provide AIN services, such as call screening, call forwarding, etc., to AIN service subscribers. In accordance with one feature of the present invention, ARS tables and/or ARS logic are implemented in the ISCP and used to return a route index to an SSP as part of an AIN service.

The ISCP 16 includes a network interface (NI) 45, a Service Control Point (SCP) 64, a Service Creation Environment (SCE) 60, a Service Management System (SMS) 62, and a Data and Reporting System (DRS) 63. A local network 67 couples the various components of the ISCP 16 together.

The network interface 45 couples the ISCP 16 to various other components of the telephone network 100 via the TCP/IP based OSN 34. The OSN 34 couples the SSPs 2, 4, 6, Intelligent Peripheral (IP) 10, and the ISCP 16 together. Thus, the OSN 34 is a network over which control and signaling information can be passed between the various telephone network system components, e.g., using TCP/IP.

The SCP 64 includes a Multi-Service Application Platform (MSAP) database 69 that includes Customer Database (CD) 73 for each of a plurality of Centrex and/or other AIN based service subscribers. The Customer Database 73 includes, for each customer a Call Processing Record (CPR) 71, 71' and, for at least some ARS subscribers, an ARS logic and/or an ARS table 75, 75'. The customer CPR is used to determine what call processing should be performed following activation of an AIN trigger. The specific call processing instructions in a CPR depend on the services to which the customer subscribes. Exemplary services which may be supported by the ISCP 16 include, e.g., call screening, call forwarding, voice dialing and a host of other services which may be provided to AIN service subscribers. In accordance with the invention, the CPR may include instructions/logic which are used in conjunction with a switch based ARS table to provide ARS services to a service subscriber.

In one exemplary embodiment, CD 73 includes one CPR for each AIN customer. In the exemplary embodiment, the customers are numbered from 1 to X 70, 70'. The CPRs may included customized ARS logic and/or include or identify an individualized customer ARS table 75, 75'. A customer's CPR is accessed in response to activation of an AIN trigger set at, e.g., the SSP 2, 4, or 6 to which the telephone line or lines to the subscriber's customer premises are connected.

The Customer Database (CD) 73, which includes CPRs 71, 71', is generated, at least initially, by SCE 60 in response to input received from a service representative or operator. As will be discussed below with regard to FIG. 5, initially generating a CPR for an ARS subscriber, may involve selecting the ARS implementation method to be used for the subscriber based on the type of switch used to service the subscriber and the complexity of the ARS service which the subscriber desires.

The SCE 60 includes an operator terminal (OT) 49, Service Order Processing (SOP) circuitry 48 an AIN provisioning system circuitry 46 and a telephone 43 at which a service representative 44 may interact with service subscribers. The operator terminal 49 is used by the service representative 44 to enter service information, e.g., to offer AIN and/or ARS service to a subscriber. The SOP circuitry 48 is used to generate service orders, e.g., orders to add or cancel an ARS service, in response to service information entered into the operator terminal 49. The AIN provisioning system circuitry 46 is responsible for setting and/or updating AIN triggers at the various signal switching points (SSPs) required to implemented a service order generated by the SOP circuitry 48.

In addition to setting AIN triggers, the AIN provisioning system circuitry 46 is responsible for generating and/or updating customer database 73, and other information stored in various locations in the system 100, as required to implement a service order. In addition to updating information in the customer database 73, the AIN provisioning system circuitry is responsible for updating information in IP 10. The updating of the IP 10 and the setting of AIN triggers can be performed by the AIN provisioning system circuitry 46 through communications with the various system components conducted using the OSN 34 and/or via SS7 links.

IP 10 includes network interface 21 for coupling to the OSN 34. IP 10 is also coupled to the first SSP 2 via audio (voice) and signaling lines. In this manner, the IP 10 can interact with other components of the system 100, e.g., ISCP 16, via communications transmitted over OSN 34 or through the SSP 2. The IP 10 may be implemented using known hardware and is capable of recording and playing messages, performing speech recognition and DTMF signal detection operations, as well as playing voice prompts and collecting information from a caller.

Figure 3:
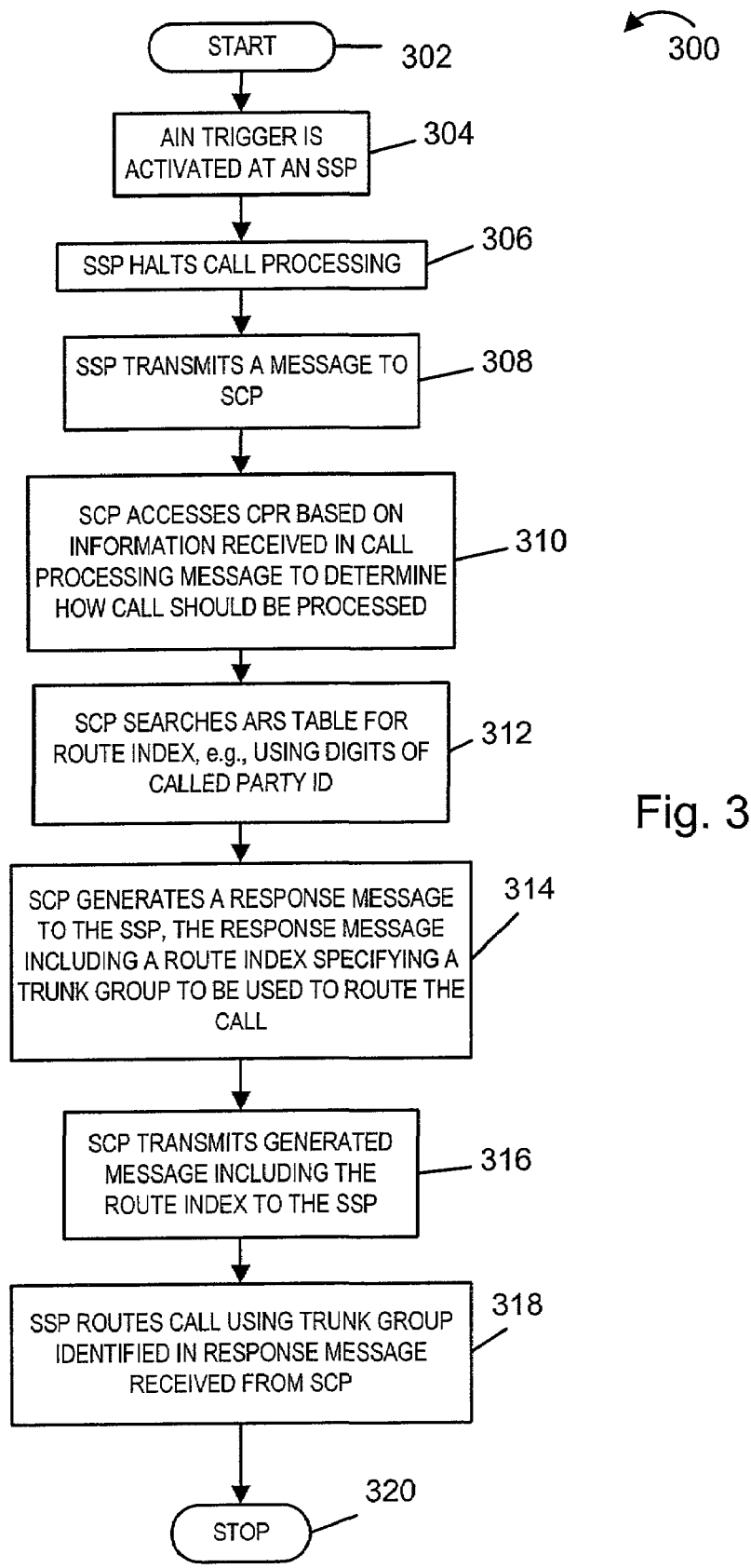
FIGS. 3 and 4 are flow diagrams illustrating first and second method of providing ARS service, in conjunction with an AIN service, in accordance with the invention.

FIG. 3 illustrates a first method of providing an ARS service using AIN techniques in accordance with the invention. In the FIG. 3 example, an ARS table is implemented in the SCP and used to provide an AIN based ARS service. The ARS table in the SCP may be use to provide ARS functionality for AIN based services while a different switch based ARS table is used to provide a subscriber ARS functionality in conjunction with non-AIN based, i.e., switch based, services. The ARS method shown in FIG. 3 can be used in conjunction with a wide range of AIN services and does not depend on the use of an ARS table in the telephone switch. Accordingly, the AIN based ARS method shown in FIG. 3 can be used to provide ARS services to a wide range of telephone customers in a manner that is relatively switch independent, e.g., the method of FIG. 3 can be used whether or not a subscriber is serviced by a DMS-100 telephone switch.

The method shown in FIG. 3, begins in start step 302, e.g., with the start of the processing of a call associated with an AIN based ARS service subscriber at the telephone switch, e.g., SSP 2, used to service the subscriber. Operation proceeds to step 304 wherein an AIN trigger set at SSP 2 is activated by the call. In response to activation of the AIN trigger, in step 306 the SSP halts call processing and then, in step 308, transmits a message to the SCP 64 in order to obtain call processing instructions. In step 310, using information, e.g., the calling party's directory number, included in the message from the SSP 2, the SCP identifies the subscriber CPR 71 to be used in determining how the call should be processed. The SCP 64 then proceeds to access the CPR 71 to determine how the call should be processed.

As part of executing the accessed CPR 71, the SCP 64 encounters ARS logic and, in step 312, proceeds to search the ARS table 75 specified by the CPR or other subscriber information to determine a route index to be used for routing the call which activated the AIN trigger. The SCP based ARS table 75 may be searched in a manner which is the same as, or similar to, the way a switch searches a switch based ARS table as part of an ARS operation. For example, a portion of a called party directory number, e.g., a portion of a telephone number, may be compared to entries in the ARS table 75 to determine a route index corresponding to the matching entry.

Using the results of the ARS table search, in step 314 the SCP 64 generates a response message to be sent to the SSP 2. In accordance with the invention, the response message includes a route index obtained from the ARS table search. The route index indicates the trunk or trunk group to be used by the telephone SSP 2 to route the call. The response message may include additional information and/or instructions used to implement one or more AIN services such as call forwarding services. Exemplary AIN response messages which may be generated in step 314 include an AIN Forward_Call message and an AIN Analyze_Route message.

Operation proceeds from step 314 wherein the message including the route index is generated to step 316 wherein the SCP 64 transmits the generated message to the SSP 2. Next in step 318 the SSP routes the call using the trunk group identified in the message received from the SCP 64. With the call having been routed from the SSP in accordance with the ARS information, e.g., route index, obtained from the SCP 64, the method stops in step 320 pending the processing of another call by the switch.

Figure 4:
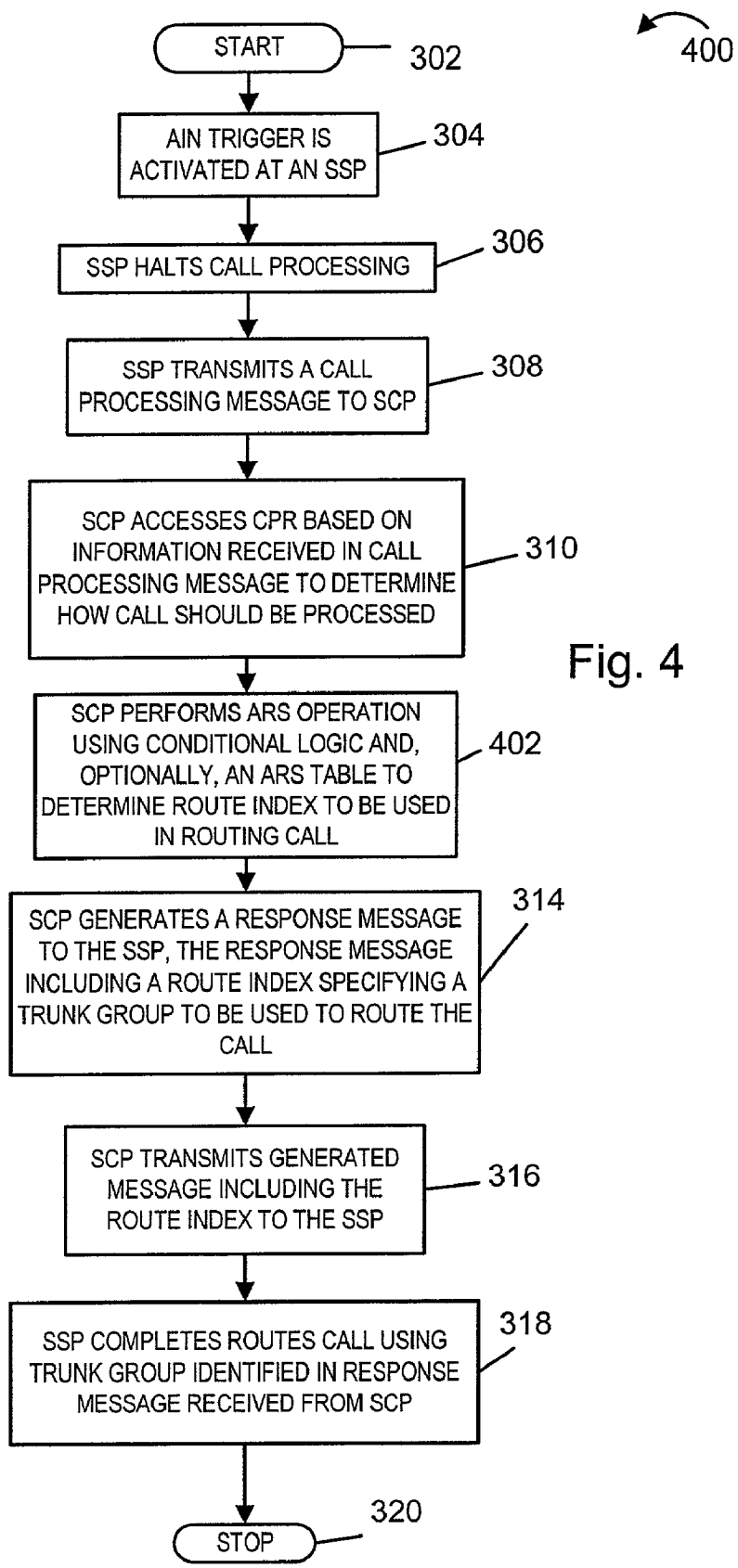

FIG. 4 illustrates a second embodiment of the present invention wherein ARS functionality is provided using AIN capabilities, e.g., control logic at the SCP and/or an SCP based ARS table. Method shown in FIG. 4 is similar to the method shown in FIG. 3 but differs in how ARS is provided at the SCP 64. Steps which are the same or similar between the FIG. 3 and FIG. 4 methods are described using the same reference numbers as used in FIG. 3 and will not be described again in detail.

In the FIG. 4 embodiment, in step 402, which comes between steps 310 and 314, control logic at the SCP 64 is used to provide an individual service subscriber with custom ARS capabilities. The custom ARS can be implemented using conditional logic and advanced AIN functionality not available in a simple table based ARS implementation, e.g., the type of ARS implementation provided by most telephone switches. For example, in accordance with this second ARS method, a subscriber's CPR and/or control logic associated with the subscriber at the SCP, can be set to route calls corresponding to specific complete telephone numbers over a certain trunk during a first part of the day and over a second trunk during a second part of the day. Control logic may also be included for routing telephone calls directed to any number in a group of telephone numbers over a particular trunk while other calls having the same first six digits will be routed over other trunks. As discussed above, ARS tables normally use the first 3 or six digits of a phone number precluding route selection based on the full telephone number. Control logic at the SCP 64, can include logic that makes route selection determinations as a function of a class of service associated with a call. Thus, in the FIG. 4 embodiment, an ARS service may be customized for a particular service subscriber to include time of day route selection constraints, class of service constraints, and/or other route selection constraints implemented through the use of logic at the SCP 64.

The advanced route selection capabilities can be particularly useful for companies with offices that are tied together by private lines over which they wish calls to be routed.

The conditional ARS logic made possible through the use of AIN can be combined with a conventional type ARS table implemented at the SCP 64. In such embodiments, route indexes to be used for routing some calls may be determined completely from conditional logic while the route index to be used with other calls may be determined from a combination of conditional logic and the AIN based ARS table. Alternatively, for calls for which routes are not selected via conditional logic at the SCP 64, route selection may be determined using an ARS table implemented in the SCP 64 or, e.g., in the case of a DMS-100 switch, at the SSP.

Various methods of providing ARS functionality in conjunction with AIN services have been described above. Depending on a subscriber's needs, e.g., ARS requirements, and the switch which serves as an ARS subscriber's end office switch, e.g., the telephone switch to which the subscriber's telephone line is directly connected, ARS service may be provided in a plurality of ways.

For example, for ARS subscribers seeking a level of ARS service which can be provided using conventional ARS tables, ARS service can be provided in conjunction with AIN services using the known DMS-100 technique discussed in the background with regard to FIG. 1 ("Method 1") or the SCP ARS table based technique of the present invention described with reference to FIG. 3 ("Method 2"). For customers requiring a more sophisticated ARS service than can be provided using a conventional ARS look-up table, either in the switch or at the SCP, the AIN based ARS technique ("Method 3") described with reference to FIG. 4 may be used. The FIG. 4 technique, which uses AIN conditional logic to implement an ARS service can be used in place of switch based ARS functionality, and be used whether or not another AIN based service, e.g., call forwarding or call screening, is being provided to the ARS subscriber.

One feature of the present invention is directed to a method of selecting, e.g., at service provisioning time, the particular ARS implementation method to be used to provide an ARS service subscriber with ARS service. The ARS implementation selection method of the present invention is shown in FIG. 5 and takes into consideration the type of telephone switch used to service the customer being provided with ARS service and the complexity of the ARS service being requested, e.g., whether or not it can be implemented using a conventional ARS table.

Figure 5:
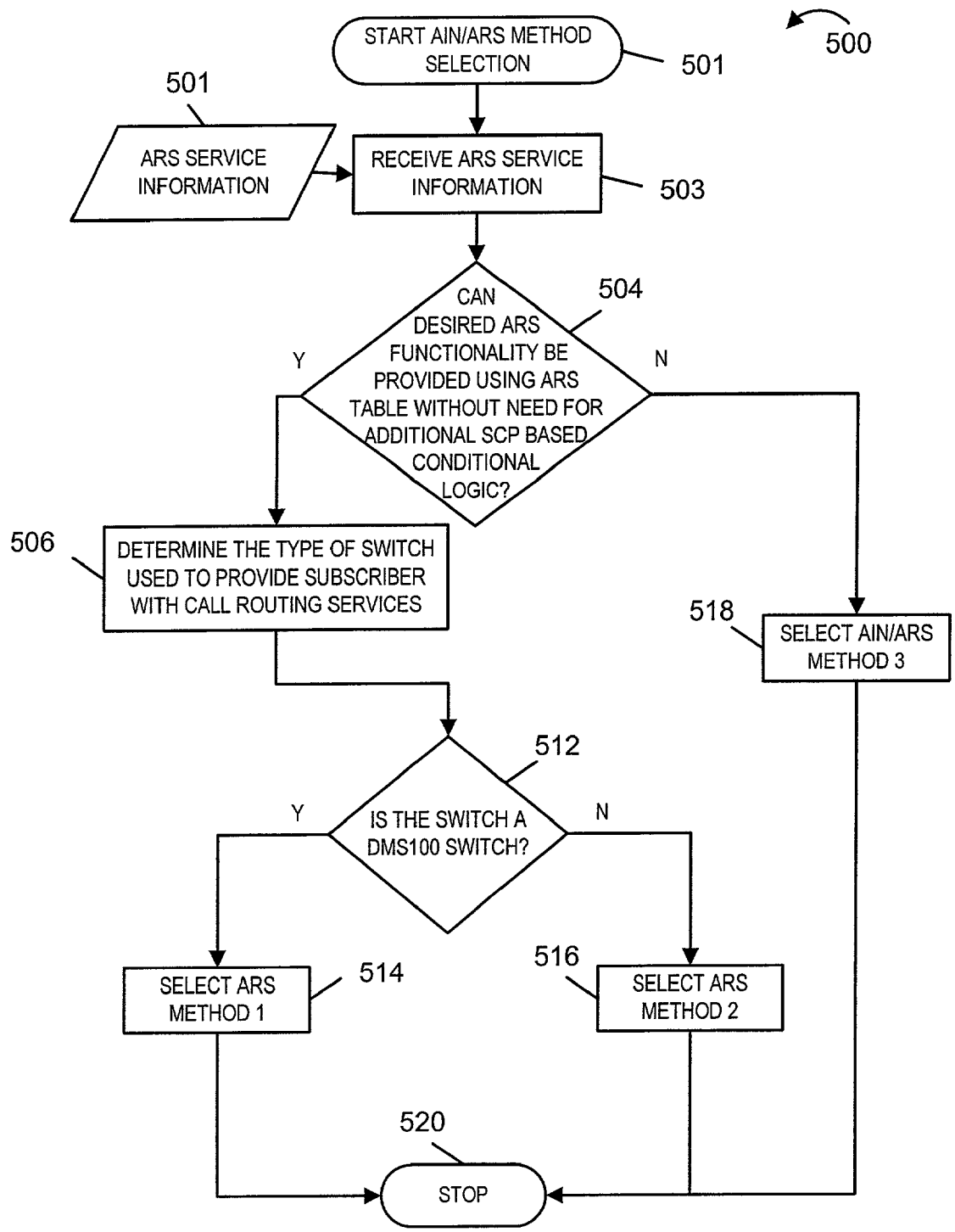
FIG. 5 illustrates a diagram that shows an ARS selection method of the present invention which may be used to select an ARS method to be used to provide an AIN service subscriber with ARS service.

The method shown in FIG. 5. of selecting the ARS implementation method can be performed by a routine stored in, and executed by, for example, the operator terminal 49 or AIN provisioning system circuitry 46. As illustrated, the method 500 begins in step 501, e.g., wherein the selection routine is executed by the operator terminal 49 in response to operator input. In step 503, the operator terminal 49 receives ARS service information 502 indicating, e.g., which carriers are to be used for routing calls to various telephone numbers or areas as indicated by the beginning portion of a telephone number. From the received information, it is possible to determine whether the desired ARS functionality can be implemented using a conventional ARS table or if more complicated conditional logic is required, e.g., in addition to an ARS table.

In step 504 a determination is made based on the received ARS service information 502 whether the desired ARS can be provided using an ARS table without the need for additional conditional logic. If the ARS service can be provided without the need for additional conditional logic, operation proceeds to step 506, wherein a determination is made as to the type of telephone switch being used to provide call routing services to the subscriber, e.g., what time of switch serves as the subscribers end office switch. This may be done by checking a database of switch information, which may be stored, e.g., at the SCP 64.

Next, in step 512, a determination is made as to whether or not the switch identified in step 506 is a DMS-100 switch. If the identified switch is a DMS-100 switch operation proceeds from step 512 to step 514 wherein ARS Method 1, which used a switch based ARS table, is selected to be used in providing the service subscriber with ARS service. From step 514 operation proceeds to step 520 wherein the selection process stops.

If in step 512 it was determined that the switch servicing the subscriber is not a DMS-100 switch, operation proceeds to step 516 wherein ARS Method 2, which used an SCP based ARS table, is selected. Operation proceeds from step 514 to step 520 wherein the selection process stops.

If in step 504 it was determined that the ARS service could not be implemented without the need for additional conditional logic not found in purely table based ARS implementations, operation proceeds from step 504 to step 518 wherein ARS Method 3, which uses conditional logic implemented by an SCP 64 to provide ARS service, is selected.

In accordance with the method of FIG. 5, the ARS method to be used to provide ARS service, e.g., alone or in conjunction with other AIN services, is selected as a function of the complexity of the ARS service to be provided and/or the type of end office telephone switch used to service the ARS customer.

The AIN base ARS methods of the present invention can be used in conjunction with, or as an alternative to, switch based ARS services. For example, a switch based ARS service may be used to provide an ARS service subscriber with ARS service when purely switch based services are provided to the customer with one of the AIN based ARS services of the present invention being used to provide ARS service to the subscriber when an AIN service is used.

While various AIN based ARS techniques of the present invention are shown as being implemented using an non-switch based ARS table provided at the SCP 64, it is to be understood that the utilized non-switch based ARS table may be external to the SCP 64 and coupled thereto in a manner that allows the ARS table to be accessed and used by the SCP 64 when making ARS determinations.

It is to be understood that numerous variations on the above described methods and apparatus are possible without departing from the scope of the invention.

What is claimed is:

1. A method of providing an automatic route selection service using a service control point, the method comprising:
   receiving automatic route selection service information corresponding to a service subscriber; and
   operating circuitry to select a method for implementing the automatic route selection service for the service subscriber from a plurality of different implementation methods as a function of type of telephone switch which serves as an end office switch for said service subscriber, a first one of the plurality of different implementation methods using a switch based automatic route selection table and a second one of the plurality of different implementation methods using a non-switch based automatic route selection table;
   incorporating automatic route selection information used to implement the selected automatic route selection method into a call processing record accessible by a service control point; and
   when said second method of implementing an automatic route selection service is selected:
      operating the service control point to use call information to determine from an automatic route selection table a telephone trunk identifier; and
      transmitting the telephone trunk identifier determined from the automatic route selection table to a telephone switch.

2. The method of claim 1, wherein the non-switch based automatic route selection table is implemented in a service control point.

3. A method of providing an automatic route selection service using a service control point, the method comprising:
   receiving automatic route selection service information corresponding to a service subscriber;
   selecting a method for implementing the automatic route selection service for the service subscriber from a plurality of different implementation methods as a function of type of telephone switch which serves as an end office switch for said service subscriber, a first one of the plurality of different implementation methods using a switch based automatic route selection table and a second one of the plurality of different implementation methods using a non-switch based automatic route selection table implemented in a service control point; and
   when said second method of implementing an automatic route selection service is selected:
      operating the service control point to determine from an automatic route selection table, using call information received from a telephone switch, a telephone trunk identifier, said service control point being coupled to said telephone switch;

transmitting the telephone trunk identifier determined from the automatic route selection table to a telephone switch; and incorporating automatic route selection information used to implement the selected automatic route selection method into a call processing record stored in a storage device accessible by the service control point.

4. The method of claim 3, wherein the telephone trunk identifier is a route index; and wherein the transmitted message is one of a Forward_Call message and an Analyze_Route message.

5. A method of providing an automatic route selection service using a service control point, the method comprising:

receiving automatic route selection service information corresponding to a service subscriber;

operating circuitry to select a method for implementing the automatic route selection service for the service subscriber from a plurality of different implementation methods as a function of type of telephone switch which serves as an end office switch for said service subscriber, and the complexity of the automatic route selection logic required to provide the automatic route selection service to the service subscriber, a first one of the plurality of different implementation methods using a switch based automatic route selection table and a second one of the plurality of different implementation methods using a non-switch based automatic route selection table implemented in a service control point; and incorporating automatic route selection information used to implement the selected automatic route selection method into a call processing record stored in a storage device accessible by a service control point; and when said second method of implementing an automatic route selection service is selected:

operating the service control point to use call information to determine from an automatic route selection table a telephone trunk identifier; and transmitting the telephone trunk identifier determined from the automatic route selection table to a telephone switch.

6. A system for providing an automatic route selection service to an automatic route selection service subscriber, the system comprising:

a telephone switch coupled to a telephony device used by said subscriber; and a service control point coupled to said telephone switch, the service control point including control logic used to access a non-switch based automatic route selection table as part of a service control point based automatic route selection service provided to said service subscriber, the service control point further comprising:

means for selecting a method for implementing the automatic route selection service for the service subscriber from a plurality of different implementation methods as a function of type of telephone switch which serves as an end office switch for said service subscriber, a first one of the plurality of different implementation methods using a switch based automatic route selection table and a second one of the plurality of different implementation methods using a non-switch based automatic route selection table; and when said second method of implementing an automatic route selection service is selected:

means for using call information to determine from an automatic route selection table a telephone trunk identifier; and means for communicating the telephone trunk identifier determined from the automatic route selection table to a telephone switch.

\* \* \* \* \*